(12) United States Patent
Raynham et al.

(10) Patent No.: US 6,530,033 B1
(45) Date of Patent: Mar. 4, 2003

(54) RADIAL ARM MEMORY BUS FOR A HIGH AVAILABILITY COMPUTER SYSTEM

(75) Inventors: Michael B. Raynham, Los Gatos, CA (US); Hans A. Wiggers, Saratoga, CA (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/429,750

(22) Filed: Oct. 28, 1999

(51) Int. Cl.$^7$ ................................................ G06F 11/00
(52) U.S. Cl. .................. 714/5; 365/230.06; 365/189.05
(58) Field of Search ........................... 365/63, 230.06, 365/189.05; 710/316; 714/5

(56) References Cited

U.S. PATENT DOCUMENTS

| | | | | |
|---|---|---|---|---|
| 5,418,911 A | * | 5/1995 | Zilka et al. .................. 710/316 |
| 5,526,497 A | * | 6/1996 | Zilka et al. .................. 710/316 |
| 5,802,395 A | | 9/1998 | Connolly et al. ............. 395/834 |
| 6,011,710 A | * | 1/2000 | Wiggers ........................ 365/63 |
| 6,349,051 B1 | * | 2/2002 | Klein ............................ 365/63 |

* cited by examiner

*Primary Examiner*—Robert Beausoliel
*Assistant Examiner*—Marc Duncan (57) ABSTRACT

The present invention provides a memory configuration that is comprised of a memory controller, a single central switch, a data bus that is electrically coupled to the memory controller and the central switch, and a plurality of N memory modules, where each of the plurality of N memory modules is radially connected to the central switch by a corresponding memory module bus. The central switch is physically located on the motherboard and helps to provide in combination with the parallel connection of the memory modules, a point to point bus between the memory controller and the memory device on the memory module. The memory modules are field replaceable units and are electrically isolated from each other for use in high availability fault tolerant systems.

6 Claims, 10 Drawing Sheets

RADIAL ARM MEMORY BUS FOR A HIGH AVAILABILITY COMPUTER SYSTEM

CROSS REFERENCE TO RELATED APPLICATION

The patent applications entitled "Self-Healing Memory System for High Availability Server", identified by Ser. No. 09/430,363 and the inventor Michael B. Raynham, filed Oct. 28, 1999 and "Chipkill for a Low End Server or Workstation" identified by Ser. No. 09/429,749 and the inventor Michael B. Raynham, filed Oct. 28, 1999 include subject matter related to the copending application.

BACKGROUND OF THE INVENTION

1. Field of the Invention

This invention is related to providing a high speed bus for a memory system, and more specifically provides a memory system for high availability servers where the speed of transactions on the bus is increased by reducing the effective capacitance of the bus and where high availability features are enabled by the improved isolation between memory modules.

2. Description of the Related Art

As computers and their central processing units ("CPUs") become capable of executing instructions more rapidly, there is a concurrent need for increased processing speed of memory instructions. In performing a typical data read operation of a memory device, a memory controller (usually the CPU or, in larger systems, a dedicated memory controller) sends a read command to a particular memory chip. This command is propagated to the chip along one or more lines of a command bus. When received by the particular chip, the command causes the chip to locate and direct an output from its internal memory array onto a data bus, as a return data signal intended for the memory controller. The output then propagates along the data bus, which may or may not travel the same route as the command bus. In the example just given, there are three sources of time delay, including the propagation time of a read command from the controller to the chip, the time required for the chip to power its internal registers and to channel the proper output onto the data bus, and the time required for propagation of the output back to the controller.

Similarly, in performing a typical data write operation to a memory device, the memory controller sends a write command to a particular memory chip along with the data to be written. This command is propagated to the chip along one or more lines of a command bus, while the data is propagated to the chip along one or more line of a data bus. When received by the particular chip, the command causes the chip to channel the data from the data bus to the specified location of its internal memory array. The data propagating along the data bus may or may not travel the same route as the command propagating along the command bus. In the example just given, there are three sources of time delay, including the propagation time of a write command from the controller to the chip, the time required for propagation of the data from the controller, and the time required for the chip to power its internal registers and to channel the data from the data bus.

Typically, design efforts have focused primarily on improving internal routing and processing of instructions within memory chips. These design efforts, however, while continually providing more responsive memory devices, do not address the primary cause of propagation delay along the data bus, the inherent capacitance of the data bus. As a result, many systems are sending data over the data bus at rates far lower than the operating speeds of the CPUs.

Figure 1A:
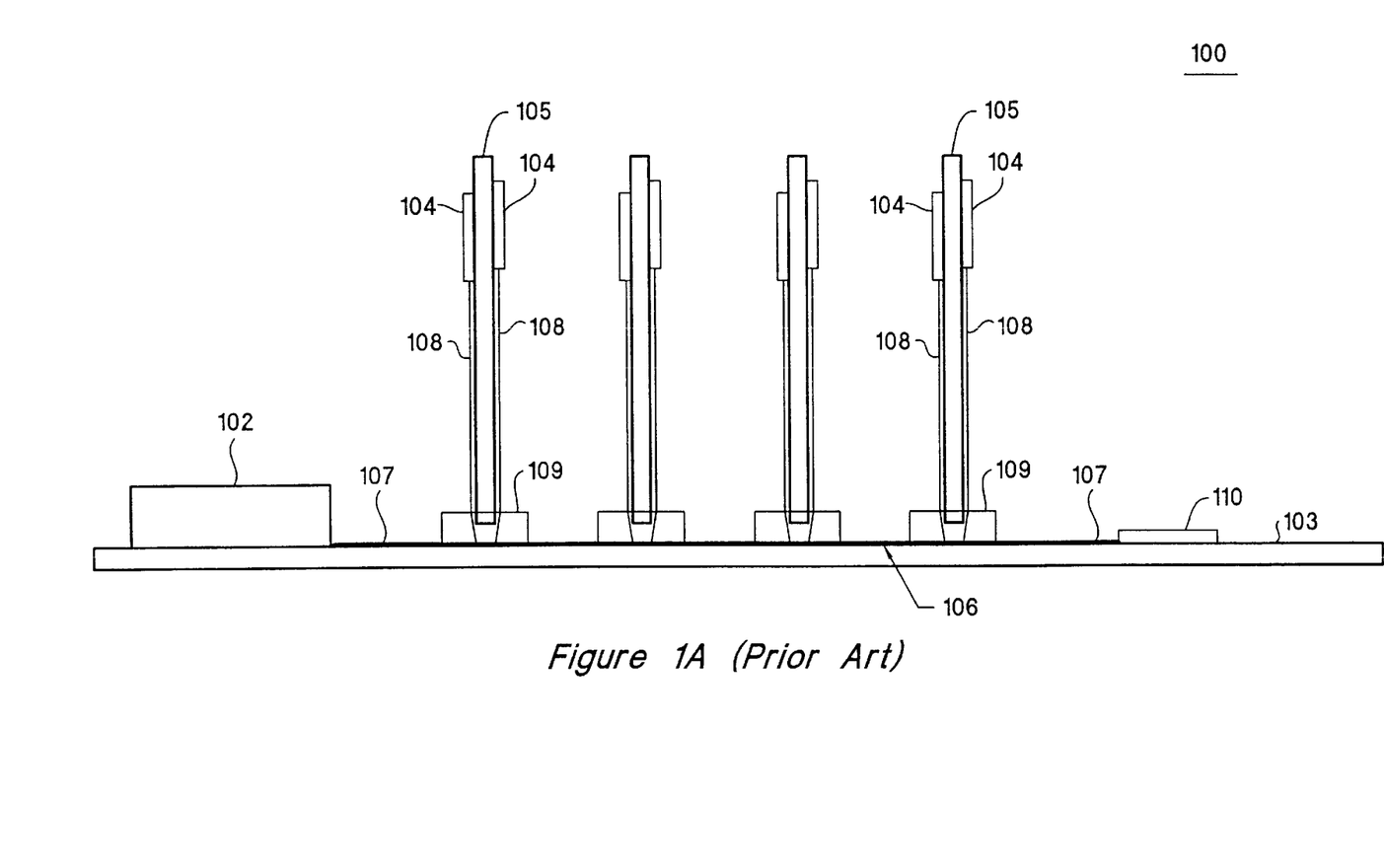
FIG. 1A shows a side view of a conventional DDR or SDR configured memory system.
Figure 1B:
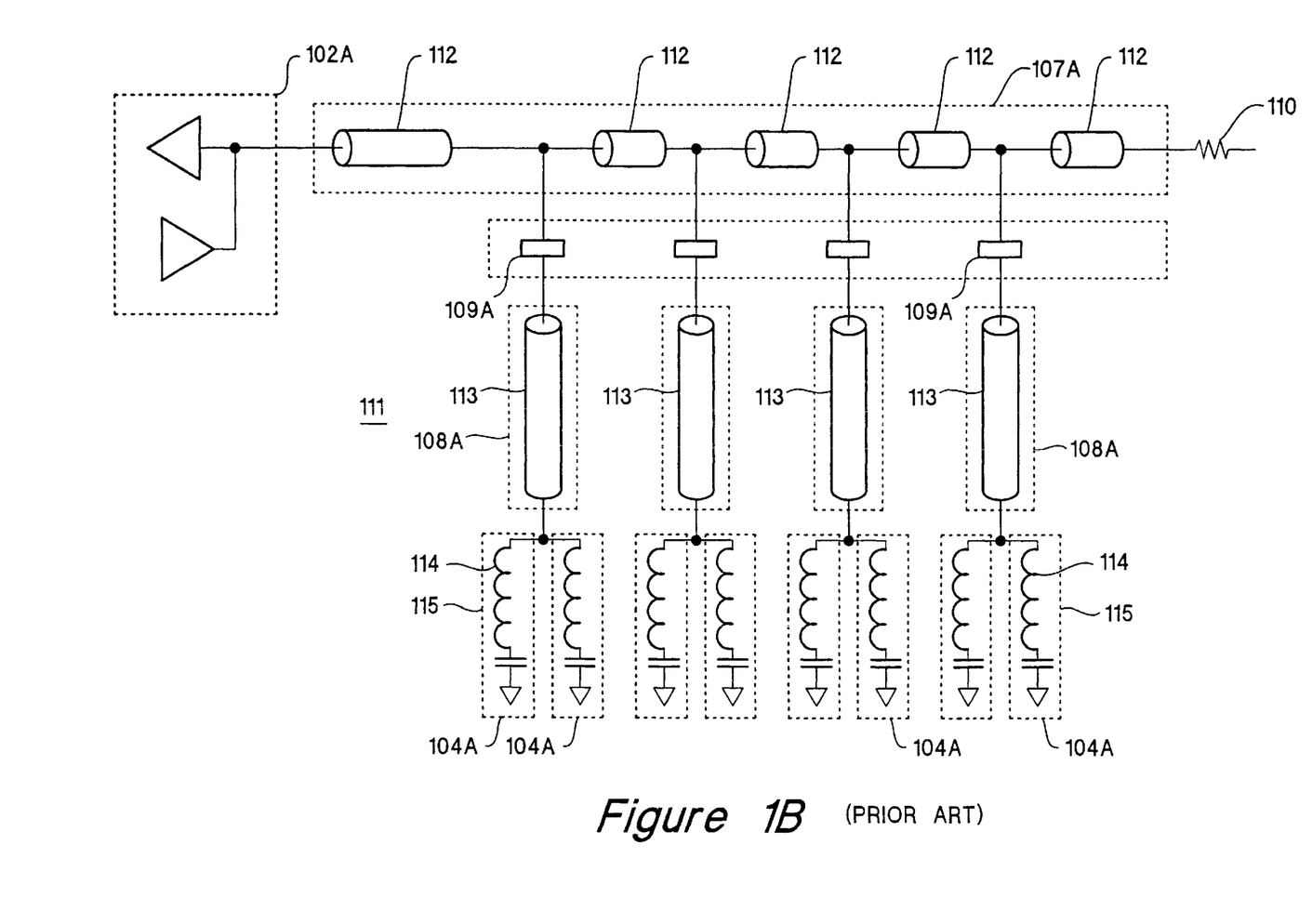
FIG. 1B is a schematic diagram illustrating the electrical equivalent of the memory system shown in FIG. 1A.

The problem of inherent capacitance of the data bus is further explained with reference to FIGS. 1A and 1B. FIGS. 1A and 1B illustrates a data path within a memory system 100. The memory system 100 shown is configured for either a SDR (Single Data Rate) or DDR (Double Data Rate) SDRAM memory system. The data path includes a memory controller 102, a motherboard 103, memory chips 104, memory modules 105, and a data bus 106. The data bus 106 includes board trace portions 107, module trace portions 108, connectors 109, and termination 110.

The memory controller is affixed to the motherboard and is electrically connected to the memory chips via the data bus such that the memory modules are connected in parallel. The memory chips are affixed to the memory modules. The board trace portion of the data bus is affixed to the motherboard and the module trace portion of the data bus is affixed to the memory modules. The connectors 109 electrically connect the board trace portions to the module trace portions and mechanically affix the memory modules to the motherboard.

FIG. 1B depicts the electrical equivalent 111 of the data path shown in FIG. 1A. For ease of reference, each electrical equivalent in FIG. 1B that represents a component shown in FIG. 1A is labeled with the reference numeral of the represented component with the suffix "A". It should be noted that the board trace portion 107A is made up of inductive and capacitive elements which together behave as a transmission line 112 having a set of impedance and transmission delay characteristics. Similarly, each of the module trace portions 108A are made up of inductive and capacitive elements which together behave as transmission lines 113, each having its own set of impedance and transmission delay characteristics.

When properly terminated with a resistor 110A, the board trace portion 107A acts as a nearly perfect transmission line (not shown) without inherent capacitance and will not in and of itself limit the operating speed of the memory system. When combined with the module trace portions 108A, however, the module trace portions 113 act as transmission line stubs coming off of the board trace portion 107A. These stubs together have a "comb filter" effect that includes significant signal reflections in the memory system that decreases signal integrity. This "comb filter" effect imposes a load on the data bus and effectively breaks the board trace portion 107A into individual board trace portion transmission lines 113.

The load imposed by the "comb filter" effect limits the maximum transmission speed of data propagation in both the board trace portion 107A and the module trace portions 108A. The "comb filter" effect imposed by the stubs generally increases as the length of each the module trace portions 108A increases. Similarly, the "comb filter" effect imposed by the stubs generally decreases as the length of each of the module trace portions 108A decreases. A second cause of the propagation delays for data signals sent from the memory controller 102A to the memory chips 104A are the inductive element 114 and capacitive element 115 associated with each memory chip. Together, the inductive and capacitive elements impose a capacitive load on the data bus including both the module trace portions 108A and the board trace portion 107A. The load imposed by the "comb filter" effect and the capacitive load imposed by the memory chip elements together form the inherent distributed capacitance load on the memory bus.

Figure 2:
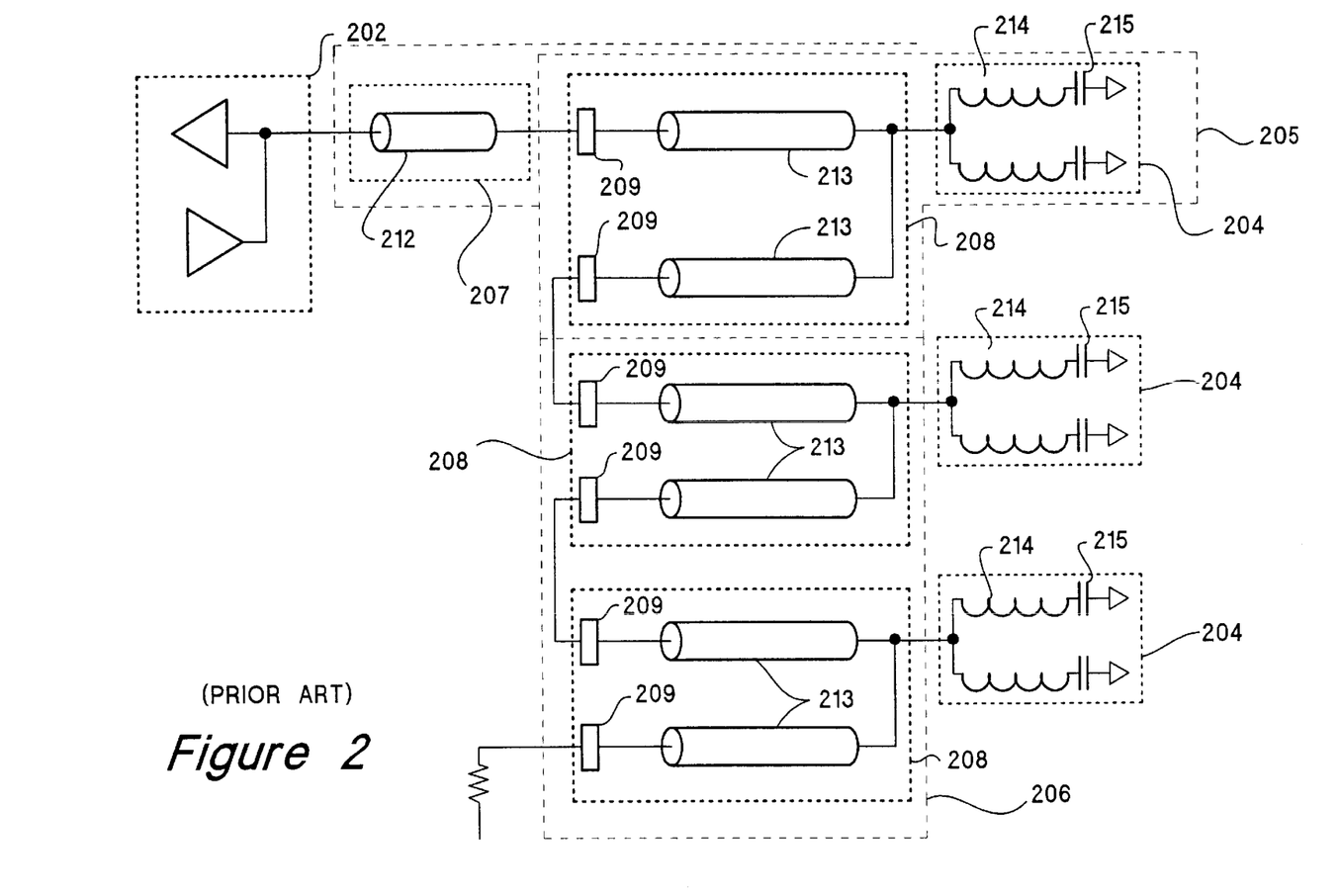
FIG. 2 is a schematic diagram illustrating the electrical equivalent of a conventional RAMBUS memory system.

Another common memory configuration for computer memory systems is the RAMBUS memory configuration. FIG. 2 shows a schematic diagram illustrating the electrical equivalent of a the data path of a conventional RAMBUS memory system. The data path includes a memory controller 202, memory modules 205, and data bus 206. The data bus includes board trace portions 207, module trace portions 208, connectors 209, and termination resistors 210. Unlike the memory configuration shown in FIGS. 1A and 1B where the memory modules are connected in parallel, in the RAMBUS configuration shown in FIG. 2, the memory modules are connected in series. In addition, the connector inductive element 209 occurs at twice as often as the equivalent memory configuration shown in FIGS. 1A and 1B that has the same number of memory modules.

The board trace portion 207 is made of inductive and capacitive elements which together behave as a transmission line having a set of impedance and transmission delay characteristics. Similarly, each of the module trace portions 208 are made up of inductive and capacitive elements which together behave as transmission lines 213, each having its own set of impedance and transmission delay characteristics. When combined with the module trace portions 208, however, the module trace portions 213 act as transmission line stubs coming off of the board trace portion 207 decreasing signal speed and integrity.

Compared to the configuration shown in FIG. 2, the configuration shown in FIGS. 1A and 1B reduces the loading effects on the data bus due to the board trace portion. However, because the effective loading on the data bus due to the module trace portions 213 is increased in the configuration shown in FIG. 2, the bus impedance that is not typically reduced. In fact, because the memory modules in the RAMBUS configuration are connected in series instead of in parallel, the effective loading on the data bus is typically increased substantially compared to the configuration shown in FIGS. 1A and 1B.

Typically the parallel configuration shown in FIGS. 1A and 1B is preferred to the RAMBUS configuration shown in FIG. 2, in part because of the lower comparative capacitive loading on the memory data bus. However, there are other problems with the RAMBUS configuration. One major problem is the lack of effective DIMM isolation. With increases in the number of DIMM modules connected to the data bus, the probability of DIMM failure increases. While the parallel configuration shown in FIG. 2 provides some DIMM isolation, the serial nature of the RAMBUS configuration effectively provides no DIMM isolation. Thus, if a single DIMM module fails with a stuck output bit for example, the entire RAMBUS memory system fails. Similarly, a connector failure in the serial RAMBUS configuration will result in failure of the memory system. Further, if a RAMBUS module is removed it causes a bus disconnection. Because of the potential failures, the RAMBUS configuration is not a preferred choice for the high availability systems that are becoming the increasingly popular business customer choice.

Other memory configurations attempt to solve the problem of inherent capacitance in the memory bus in several ways. One solution is to provide series resistors on the module trace portion of the data bus in order to electrically separate the module trace portion from the board trace portion of the bus. This technique has been successfully used for frequencies of up to 66 MHZ, but has not been very successful at higher frequencies. Another solution is to provide FET switches on the mother board that break the data bus into sections. For example, a switch multiplexor has been used to separate a set of four memory modules into two electrically independent groups of two modules. This approach creates two smaller memory buses, each presenting less inherent capacitance that the original larger bus. Each of these smaller buses however, still have inherent capacitance load on the data bus and the switch itself adds a capacitive load and thus have limited signal propagation speed.

Figure 3A:
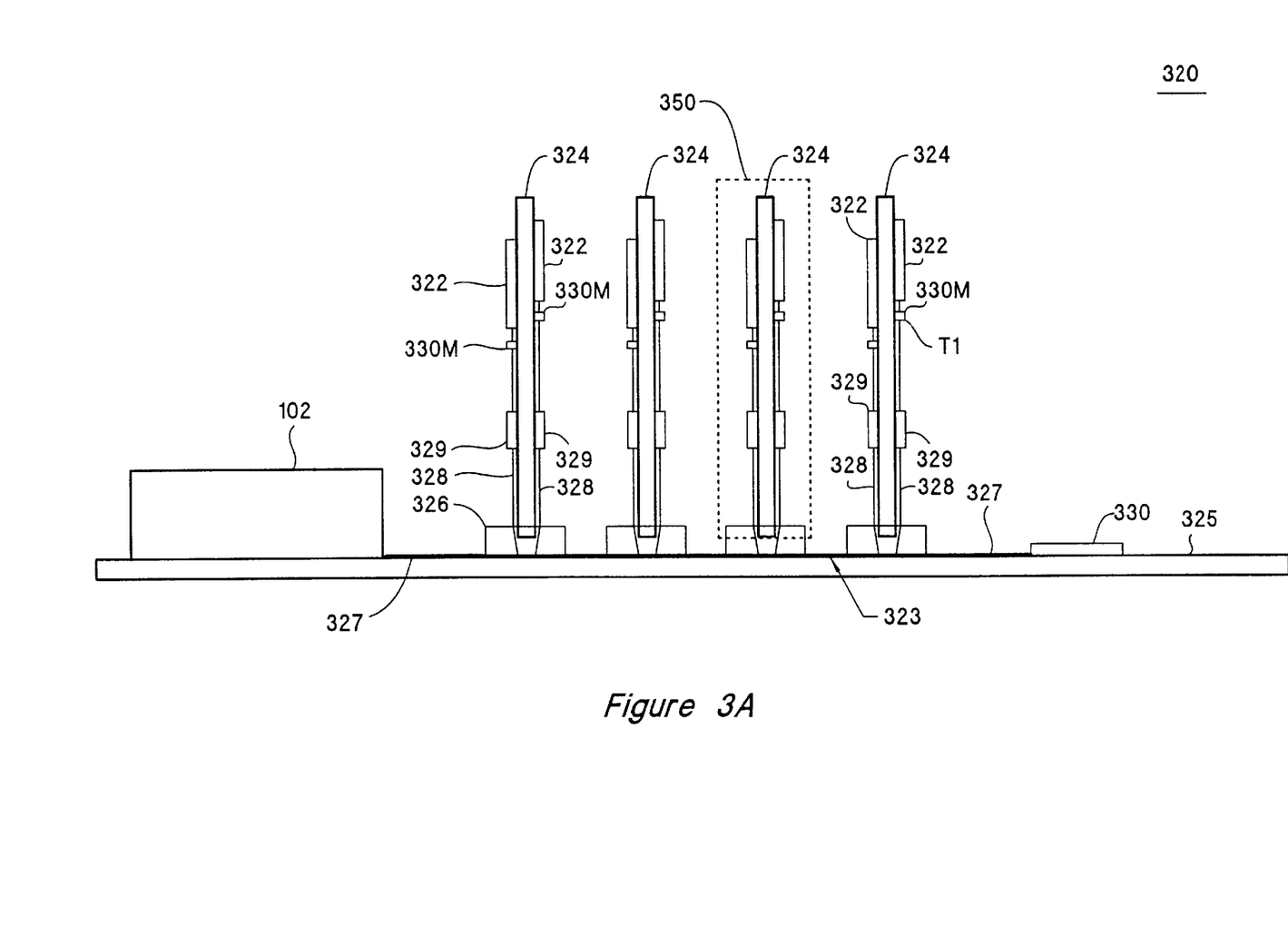
FIG. 3A is a side view of a switch controlled module configuration.
Figure 3B:
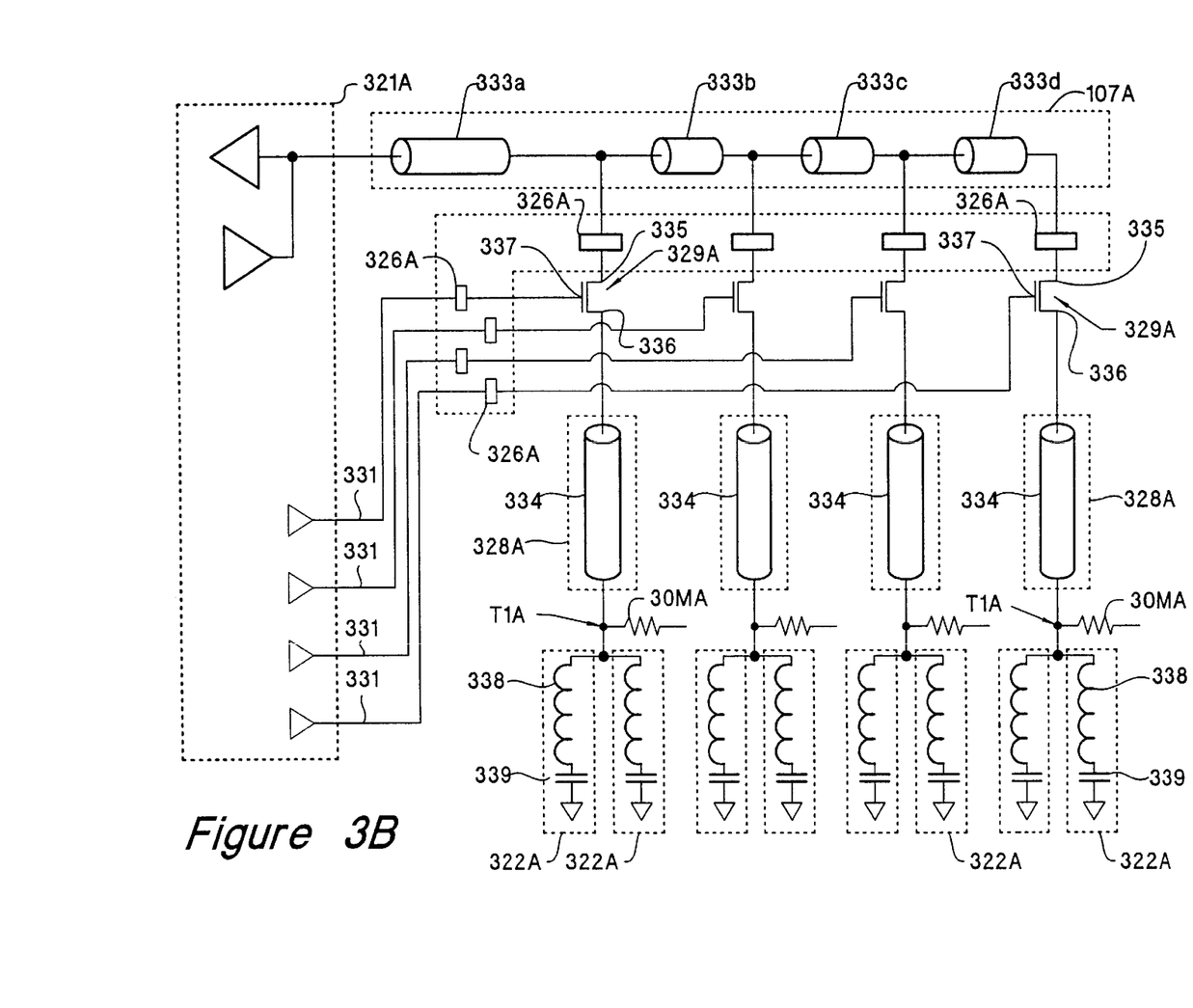
FIG. 3B is a schematic diagram illustrating the electrical equivalent of the switch controlled module configuration shown in FIG. 3A.

Another solution to the problem of the inherent capacitance in the memory bus is shown and described with reference to FIGS. 3A and 3B. FIG. 3A is a side view of a switch controlled memory module configuration described in a related patent application having the title "Capacitance Reducing Memory System Device, and Method" having Ser. No. 08/960,940 and filing date of Oct. 30, 1997. FIG. 3B is a schematic diagram illustrating the electrical equivalent of the switch controlled memory module configuration shown in FIG. 3A. For clarity, the electrical equivalents of items shown in FIG. 3B are marked with the same reference numerals as the items in FIG. 3A with an added "A" suffix.

Referring to FIG. 3A, the memory devices 322 and switches 329 are preferably affixed to removable memory modules 324 that allow the memory system configuration to be easily changed by simply adding modules or by replacing some or all of the modules. Each of the memory modules 324 are mechanically affixed to a main board 325 by a connector 326. The connector provides all the electrical connections between the memory controller and the memory devices. The electrical connections include interconnects between the portion of the data bus on the main board 327 and the portion of the data bus on the module 328.

Referring to FIG. 3B, when a switch 329A is in an open position (terminals 335 and 336 electrically decoupled) the memory device 322A associated with the open switch is decoupled from the data bus as is the portion of the data bus between the switch and the memory device. This means that no data can be sent or received by the memory device, or memory devices, that have been electrically decoupled from the data bus. It also means that the portion of the data bus between the switch and the memory device is decoupled from the data bus and does not add to the stub length of module portion 328A. Further, the capacitive load of the memory devices 322A which have been decoupled from the data bus as a result of the switch being open will no longer contribute to the overall capacitive load on the data bus (as seen by the memory controller and any coupled memory devices) thus increasing the data transfer speed between the memory controller and the coupled memory device.

The board portion 327A includes a series of transmissions lines 333. The module portions 328A each include a transmission line 334 that forms a transmission line stub coming off of board portion 327A. Each stub thus formed, creates a "comb filter" effect on the data bus that places a load on the data bus including board portion 327A and module portion 328A. This "comb filter" effect created load is usually proportional both the number of module portions 328A attached to the board portion 327A and to the length of each of the module portions 328A. Compared to the memory configurations shown in FIGS. 1A, 1B and 2, the memory configuration shown in FIGS. 3A and 3B with a FET switch on each memory module helps decrease the capacitive loading due to the memory modules by eliminating the capacitive loading of the memory devices that are decoupled or not electrically coupled to the data bus. This helps to reduce the comb filter effect, thereby increasing the data transfer speed of the data bus.

Although the configuration shown in FIGS. 3A and 3B does improve isolation compared to the embodiment shown n FIG. 2, it still does not provide adequate isolation to prevent system failure in the event of a connector failure. In addition, the embodiment shown in FIGS. 3A and 3B do not provide the ability to do simultaneous write to two or more memory modules. Both of these features are desirable in high availability computer systems.

However, a problem with the embodiment shown in FIGS. 3A and 3B is that although compared to the embodiment shown in FIGS. 1A and 1B, it reduces the comb filter effect, the trace to the active DRAM in the embodiment shown in FIGS. 3A and 3B still forms a stub on the data bus. A further problem with the embodiment shown in FIGS. 3A and 3B is that it does not significantly reduce the capacitive loading due to the board portions 327A of the memory system. Often times it is this loading 327A that becomes the most significant factor for signal delay and not the capacitive loading of the memory devices, which is significantly reduced by the configuration of FIGS. 3A and 3B. The capacitive loading due to the board 327A becomes especially problematic as the number of boards and DIMMs in the computer system is increased. Because customer demand for increased memory in the high end servers has increased, one sometimes sees the anomalous behavior of a large or high end server having lower r memory system performance than a small or low end server. This decreased performance is often compensated by adding large CPU caches. However, the addition of large CPU caches can significantly increase system cost.

A memory system that significantly minimizes the capacitive loading due to board traces while still minimizing the effects of capacitive loading to the memory devices, which provides high availability features, and provides improved isolation is needed.

SUMMARY OF THE INVENTION

The present invention provides a memory configuration that minimizes the capacitive loading due to board traces while still minimizing the effects of capacitive loading due to the memory devices, provides high availability features, and provides improved isolation. The memory configuration includes a memory controller and a single central 1:N switch that is used to connect the memory controller to the N memory modules in a manner that reduces the capacitive loading on the data bus. The memory configuration includes a memory controller, a central switch, a data bus that is electrically coupled to the memory controller and the central switch, and a plurality of N memory modules, where each of the plurality of N memory modules is electrically connected radially to the central switch means by a separate memory module bus.

In the preferred memory configuration, the central switch acts as a switch to all of the N memory modules. The central switch is physically located on the motherboard preferably central to and between the memory modules. The memory configuration effectively results in a point to point bus between the memory controller and the memory device on the memory module. The memory configuration essentially eliminates the impedances due to the board traces between the memory modules that are not electrically connected to the data bus. The elimination of these intermodule impedances from the configuration means that the board trace to the active DRAM of the memory module does not form a stub on the bus eliminating the comb filter effect.

Because the capacitive loading effects of the board traces between memory modules is effectively eliminated, multiple memory modules can be added to the system without decreasing the speed of the data bus. This is especially critical with today's increasing memory needs. Thus according to the configuration of the present invention, the system memory size can be substantially increased without decreasing the data bus speed.

The point to point bus provided by the memory configuration makes the memory system design easier since transmission line reflections are significantly reduced. Further, the "stubless" point to point arms of this memory configuration allows much higher data transfer rates because capacitive loading is significantly reduced. Because the comb filter effect is eliminated, the system can be run close to the maximum frequency of the memory module. Thus, the point to point bus configuration allows clocking at "close to" the core DDR frequency. Alternatively, if an SDR frequency is used, the margins could be increased significantly with a fixed speed.

The central 1:N switch preferably includes a data selection circuit and a decoding circuit. The data selection circuit in combination with the data selection circuit help choose which memory modules will be accessed. The data selection circuitry preferably includes a transceiver circuit which determines the direction of data flow and selects which memory channel is active.

The memory configuration provides improved isolation. Typically, a problem on one of the modules or with a module connector will not effect the main data bus. For example, for the case where two connector pins short together, although the memory module with the failed connector will not be available to the memory system, the remaining memory modules will remain unaffected by the connector short. Further, the memory configuration of the present invention helps to isolate the memory modules from each other, so that with the appropriate support, the memory boards can be easily hot swapped since a module inserted on one arm of the central switch will not disturb the other arm, thus adding to the high availability features of the memory system. Hot swapping is feasible in part, because a higher level of redundancy is possible since each module is located on an independent arm or channel of the data bus.

In addition, the memory configuration allows flexibility in implementing redundant memory schemes. The isolation provided by the memory module configuration allows for simultaneous memory operations (read, write) that are not possible in serial or parallel buses without a substantial performance impact. The memory configuration allows the system to write identical data simultaneously to more than one memory module at a time. This is useful when memory mirroring, when rebuilding data on a "spare" module in a redundant system, or alternatively when performing memory initialization (such as ECC memory initialization) where identical data is written to multiple memory channels simultaneously. Also, for higher performance applications, if registers are used in the central switch one can read from more than one memory module at a time to the central switch, and also operate at a higher clock frequency since the controller to the memory chip delay is cut into two. The CMOS SSTL-2 central switch also restores signal levels for data bus signals that pass through it.

A further understanding of the nature and advantages of the present invention may be realized with reference to the remaining portions of the specification and the attached drawings.

DETAILED DESCRIPTION OF THE PREFERRED EMBODIMENTS

Figure 4A:
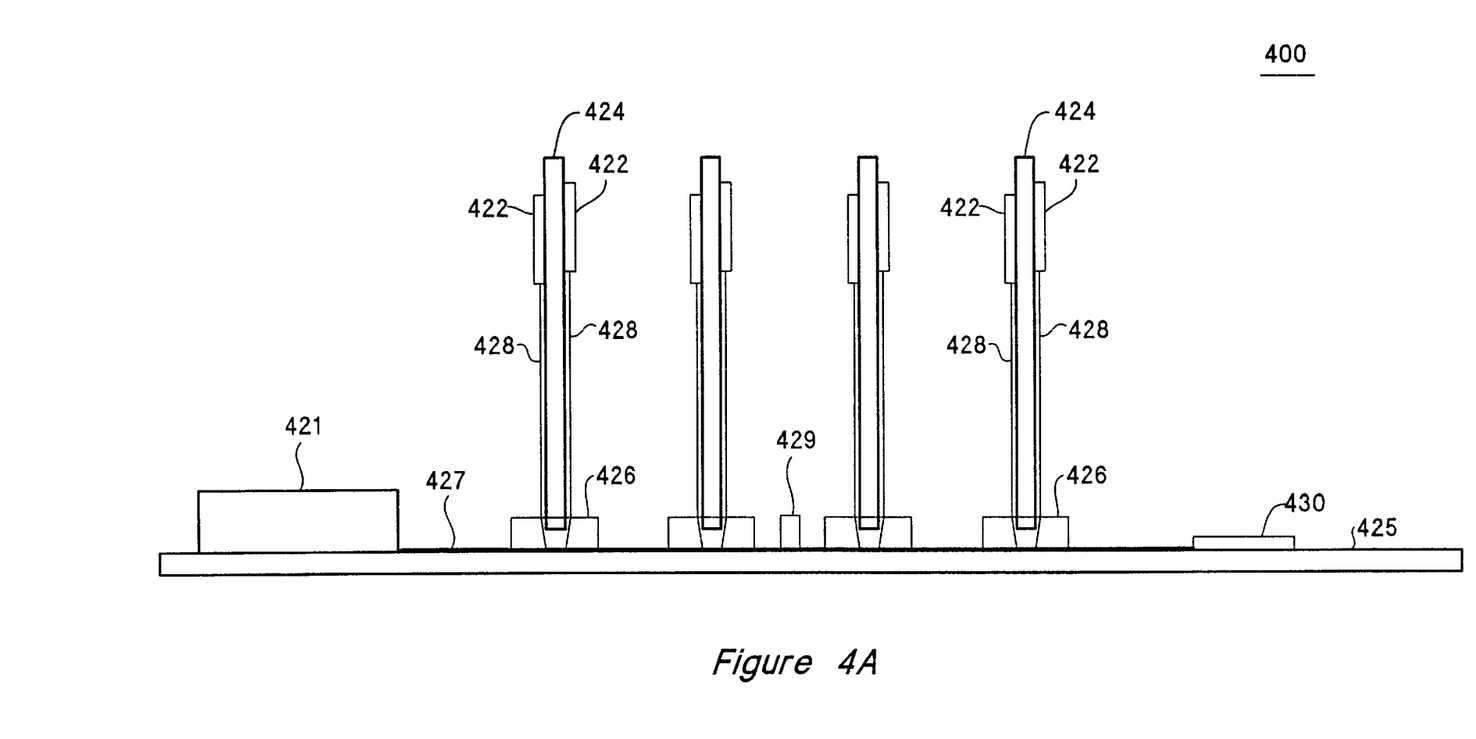
FIG. 4A is a side view of the radial arm memory bus configuration of the present invention.
Figure 4B:
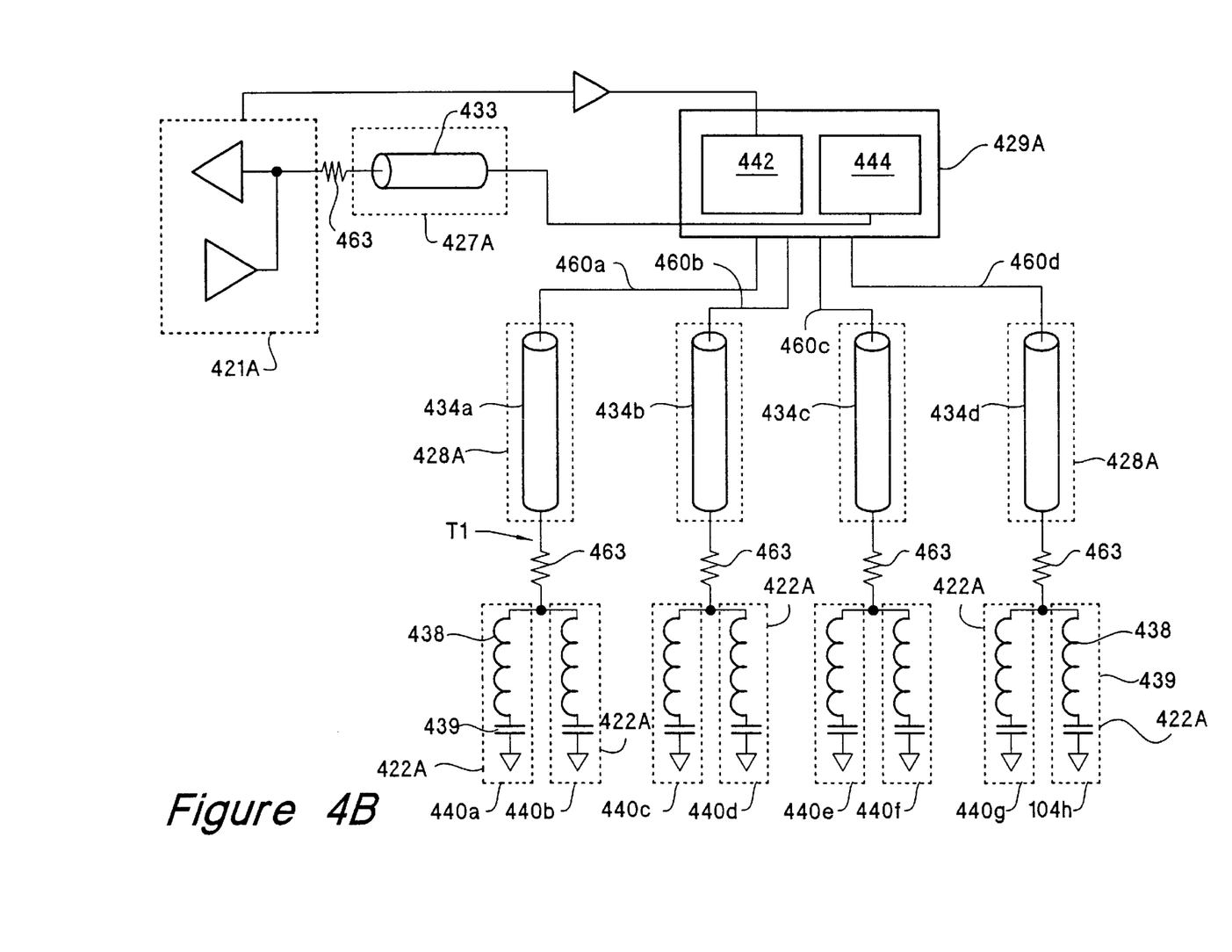
FIG. 4B is a schematic diagram illustrating the electrical equivalent of the radial arm memory bus configuration shown in FIG. 4A.

FIG. 4A is a side view of the radial arm memory bus configuration 400 according to the present invention. The memory configuration 400 of the present invention includes a memory controller 421 and an intelligent central 1:N switch 429 that is used to connect the memory controller 421 to the memory devices 422 on the memory modules 424 in a manner that reduces the capacitive load on the data bus 427. Referring to FIG. 4B, the memory configuration includes a memory controller 421, a central switch 429, a data bus that is electrically coupled to the memory controller and the central switching means, and a plurality of N memory modules 424, where each of the plurality of N memory modules 424 is electrically connected radially or individually to the central switch by its corresponding memory module bus 460a, 460b, 460c, 460d.

Figure 4C:
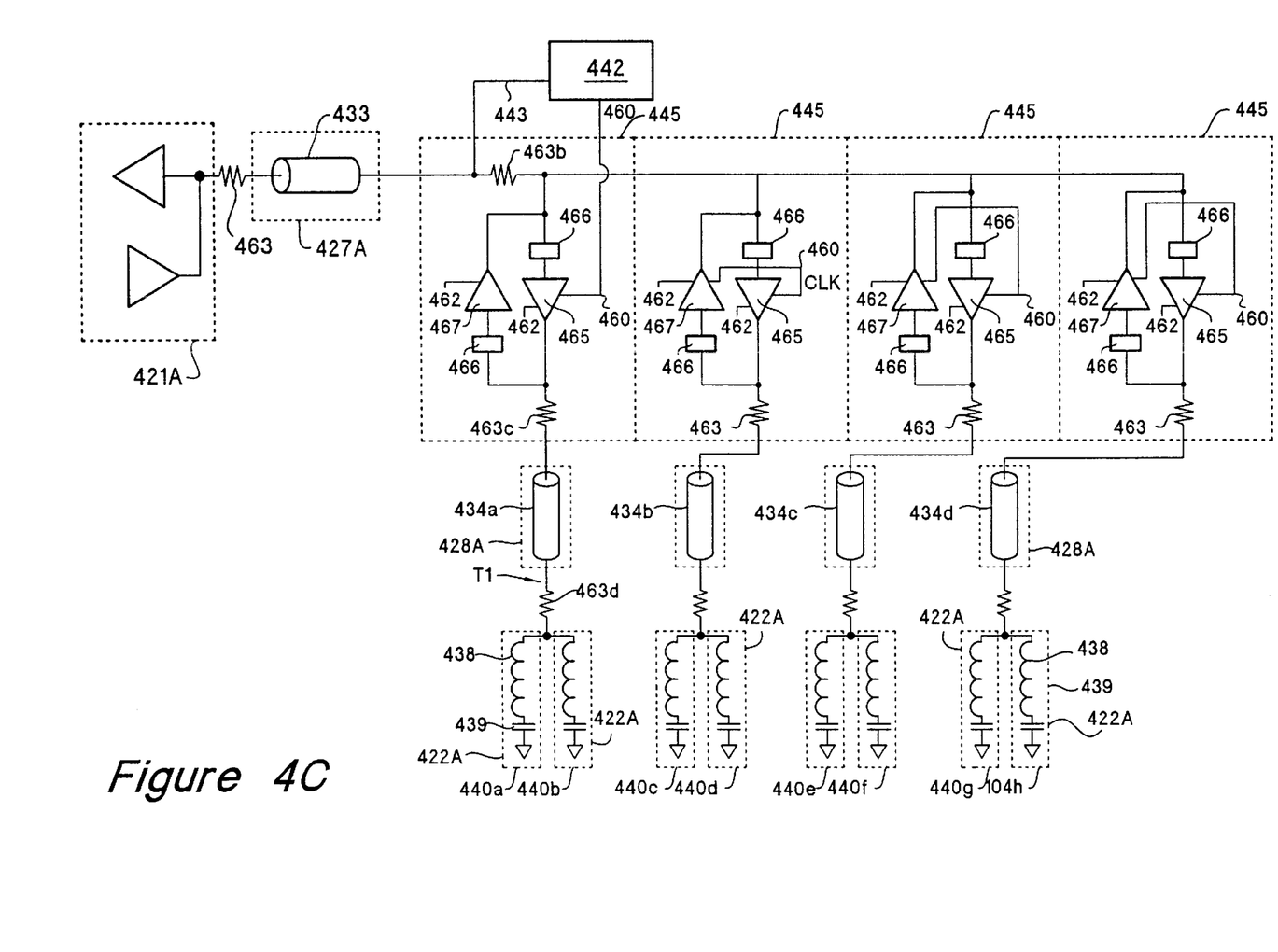
FIG. 4C is a schematic diagram of the radial arm memory bus configuration shown in FIG. 4B showing with more detail of the preferred implementation of the switching means.
Figure 5A:
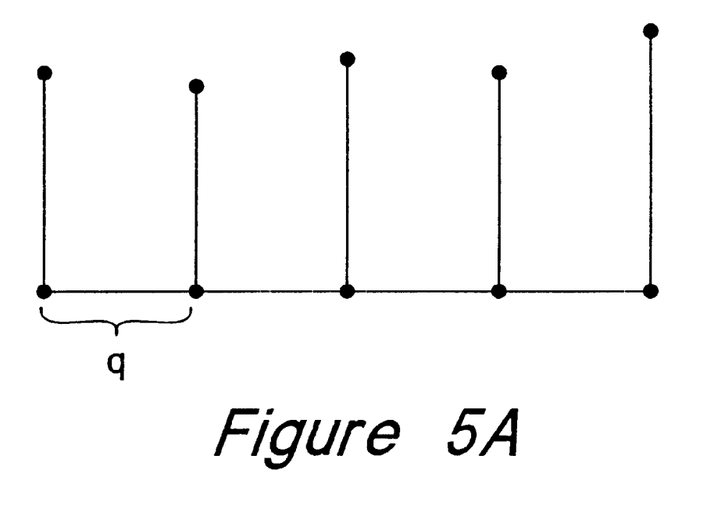
FIG. 5A shows a high level representative diagram of a parallel bus configuration such as is shown in FIGS. 3A and 3B.
Figure 5B:
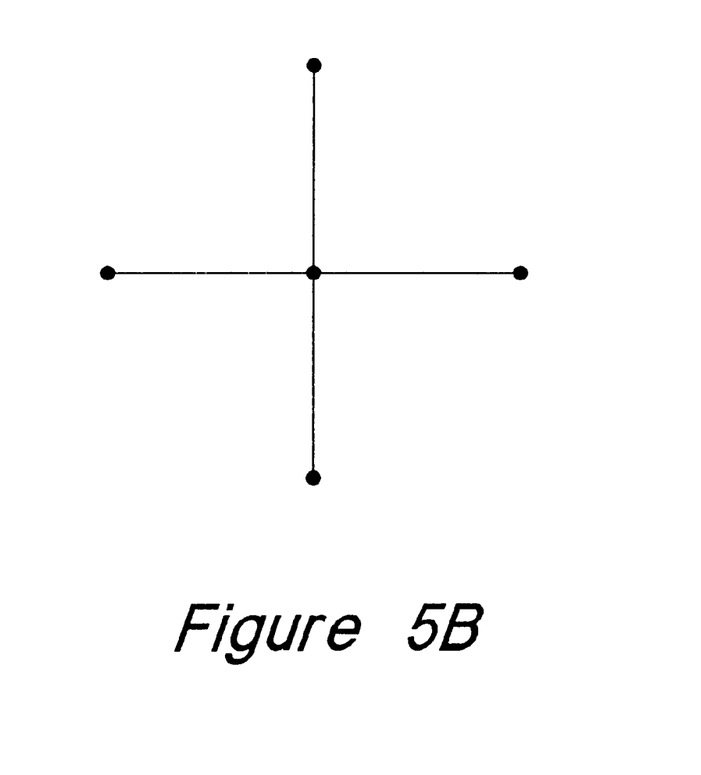
FIG. 5B shows a high level representative diagram of a radial arm bus configuration such as is shown in FIGS. 4A–C.

In the preferred embodiment, the memory modules 424 are connected radially to the data bus. FIG. 5A shows a high level representative diagram of a parallel bus configuration such as is shown in FIGS. 3A and 3B. FIG. 5B shows a high level representative diagram of a radial arm bus configuration such as is shown in FIGS. 4A–C. Referring to FIG. 5A, the parallel configuration has a distributed load along the data bus where for the configuration shown the length of the board trace between memory modules is equal to q. In contrast, the radial configuration includes a central hub or switch with arms connected to each load, where the effective length of the board trace q in FIG. 5A seen by the memory controller is zero and provides a point to point bus.

Referring to FIG. 4A, the central switching means 421 is preferably affixed to the mother board 425, and is preferably in a position central to the memory modules in order to reduce the trace density of the connections to the different memory modules. The memory devices 422 are preferably affixed to removable memory modules 424 that allow the memory system configuration to be easily changed by simply adding a memory module or by replacing some or all of the memory devices. Each of the memory modules 424 are mechanically coupled to a motherboard 425 by a connector 426. The connector 426 also provides all the electrical connections between the memory controller and the memory devices. The electrical connections include interconnects between the portion of the data bus on the memory module 428. The electrical connections also include address bus connections (not shown) and the switch control line connections (not shown).

Referring to FIG. 4A, the memory controller 421, which may be either a CPU or a dedicated memory controller, is electrically connected to a data bus 427. The controller 421 selectively accesses numerous memory devices 422 on the memory modules. The devices 422 on the memory modules may be connected in series, in parallel, or in some combination of the two along the data bus 427. The memory devices may include read only memory (ROM) or random access memory (RAM), and are preferably dynamic random access memory (DRAM). The memory controller can also selectively electrically couple and decouple each of the memory devices from the data bus, either individually or in small groups using the central switching means. In addition to being electrically connected to the data bus, the central switch is electrically connected to the controller via a control line (not shown in FIG. 4A).

FIG. 4B is a schematic diagram illustrating the electrical equivalent of the radial arm memory bus configuration shown in FIG. 4A. FIG. 4B helps illustrate that the data bus is electrically equivalent to a series of transmission lines. For clarity, the electrical equivalents of items shown in FIG. 4A are marked in FIG. 4B with the same reference numerals as the items with an added "A" suffix. Also for clarity, the data bus is depicted as a single data line. In reality, data busses typically include numerous data lines running in parallel.

Referring to FIG. 4B shows a memory controller 421A that is electrically coupled to the central switch 429A. Preferably a termination resistance 463 is electrically connected in series with the controller 402A and central switch 429. In the embodiment shown in FIG. 4B, the central switch is electrically connected to four (N=4) memory modules where each memory module includes two memory devices. However, in alternative embodiments, the number of memory modules and the number of memory devices on each memory module may vary to meet system requirements.

The memory configuration according to the present invention is scalable so that the system complexity, and thus the system cost, is lower for a smaller memory system since N is smaller and the trace area needed is lower. The trace density is increased to further reduce the area used by routing the same data bits from each channel together (i.e. data bit 0 channels 460a–d). In the embodiment shown in FIG. 4B, the memory configuration has four spokes or arms. In other words, the memory bus has four different data memory channels and is coupled to four different memory modules. However, the number of arms can be easily modified dependent upon the system requirements.

For current computer systems, a low end system would preferably have two to four arms and a high end system would preferably have four to eight arms, however, this number could be expanded to nine or more. In one embodiment of the present invention, the server system is a high end system that includes 9 DIMM (pairs). For a 64 GB memory, the 9 DIMM pair embodiment is implemented using sixteen 4 GB SDRAM DIMMs. Alternatively, for a 32 GB memory, the 8 DIMM pair embodiment is implemented using sixteen 2 GB SDRAM. The two additional DIMMs, one per 72 bit bus section, in the 64 GB memory could be used as spare memory in a redundant system.

The impedance 428A is representative of the transmission loading from the central switch 429 to the memory device 422. Thus, the impedance 428 includes the impedances due to the board trace from the central switch to the connector, the impedance due to the connector, and the impedance of the board traces from the connector to the memory device being accessed. The transmission line delay to the different memory modules 434a, 434b, 434c, 434d may be different since the lengths of the board traces from the central switch to the connector of the memory module (and thus its corresponding delay) are typically different, however the data and data strobe within each group of four data bits are matched lengths.

Comparing the connection of the memory controller to the switching element of the memory configurations shown in FIGS. 4B and 3B, it can be clearly seen that the memory configuration shown in FIG. 4B eliminates the impedances 333b, 333c and 333d, the impedances representative of the board traces between the memory modules. The elimination of these impedances 333b, 333c and 333d clearly reduces the capacitive loading on the data bus, and will typically substantially increase the speed of the data propagation on the bus. The elimination of this intermodule impedance (333b, 333c, 333d) has become increasing significant as the number of memory modules connected to the board increases and has in the past been a factor in the limitation of the system memory size.

In addition, the elimination of the intermodule impedance helps eliminate the "comb filter" effect which was a critical problem in the memory configuration shown in FIGS. 3A and 3A. As previously described, the comb filter effect is due to a transmission line stub that is formed by the module portion 428A coming off board portion 427A. In the embodiment shown in FIGS. 3A–B, the board portion 327A is made up of the elements 333a, 333b, 333c, 333d. The elimination of the intermodule elements 333b, 333c, and 333d from the configuration of FIG. 4B, eliminates the board portion from which the module portion comes off, essentially eliminating the comb filter effect. Because the trace to the active DRAM does not form a stub on the bus, the comb filter effect is eliminated.

The point to point bus provided by the memory configuration shown in FIGS. 4A–D makes the memory system design easier since transmission line reflections are significantly reduced. Further, the "stubless" point to point arms of this memory configuration allows much higher data transfer rates because capacitive loading is significantly reduced. Because the comb filter effect is eliminated, the system can be run close to the maximum frequency of the memory module. Thus, the point to point bus configuration allows clocking at "close to" the core DDR frequency. Alternatively, if an SDR frequency is used, the margins could be increased significantly with a fixed speed.

The combination of the direct link from the central switch to the controller and the direct link from the central switch to the memory device (due to the radial or connection of the memory modules to the central switch) provides a point to point bus. The impedance due to the controller to central switch connection was described in the previous paragraphs. The central switch acts in combination with the memory controller to selectively couple a memory device or devices on a single memory module to the data bus. When a memory device is not being accessed, the memory module is decoupled from the data bus. Because only the memory module that is being accessed is electrically coupled to the data bus, the capacitive loading effects of the other memory modules connected in parallel to the switching means does not load the data bus. This selective coupling of the memory devices to the data bus reduces the capacitive loading effects on the data bus due to the individual memory modules.

The single central switch configuration shown in FIG. 4 allows the bus to be in effect a point to point connection instead of the distributed load system shown in FIGS. 1–3. Further if something happens to one arm of the data bus, it does not effect the other modules as easily since basically each arm is independent of the other. This increases system reliability. This is especially problematic in server systems since servers need large amount of memory, so it is a big benefit if one of many memory modules can fail and the remainder of the system can still function. Typically, a problem on one of the modules is not going to effect main data bus. For example in the configuration shown in FIGS. 2 and 3A–B, a short of two connector pins together will short out entire bus. However, in the memory configuration of FIGS. 4A–C, although the memory module with the failed connector will not be available to the memory system, the remaining memory modules will remain unaffected by the connector short.

Further, the memory configuration of the present invention helps to isolate the memory modules from each other, so that with the appropriate support, the memory modules can be easily hot swapped, thus adding to the high availability features of the memory system. Hot swapping is feasible in part, because a higher level of redundancy is possible since each module is located on an independent arm or channel of the data bus. The command-address bus may need to be similarly modified or supported as the data bus for hot swapping to be enabled.

Because the central switch configuration of FIGS. 4C provides isolation between the memory module buses 460a, 460b, 460c, 460d, there is flexibility in implementing redundant memory schemes. The isolation of the memory module configuration allows simultaneous memory operations (read, write) are possible for use in redundant or higher performance systems that are impossible in serial or parallel buses without a substantial performance impact. The configuration shown in FIG. 4C allows the system to write identical data simultaneously to more than one memory module at a time. This is useful when memory mirroring, when rebuilding data on a "spare" module in a redundant system, or alternatively when performing memory initialization (such as ECC memory initialization) where identical data is written to multiple memory channels simultaneously. Also, for higher performance applications, one can read from more than one memory module at a time to the central switch.

The central 1:N switching means 429A preferably includes a data selection means 444 and a decoding means 442. The central switching means is an intelligent switch where preferably, some of the logic functions conventionally performed in the memory controller or CPU, are performed by the central switch.

Referring to FIG. 4C shows a schematic diagram of the radial arm memory bus configuration shown in FIG. 4B showing with more detail of the preferred implementation of the switching means. The central switching means includes a decoding means 442 and a data selection means 444.

Typically the decoding means 442 is a 2:4 decoder where the input to the decoder is a two bit address which indicates which modules will be accessed. The input 443 to the decoding means is a two bit address which indicates to the switch which memory modules are to be accessed. In the preferred embodiment more than one memory module may be accessed simultaneously.

The decoding means output preferably includes two signals, a clock signal 460 and a channel enable signal 462. The data selection circuit 444 typically includes a plurality, here N=4, channel selection circuits 445. Both the clock signal 460 and the channel enable signal 462 are inputs to the channel selection circuit 445. Preferably each channel selection circuit includes a transceiver circuit which allows for bidirectional data flow. The transceiver preferably includes two CMOS buffer circuits 465, 467. When one CMOS buffer circuit is on allowing data flow, the other CMOS buffer circuit is high.

Assume for the purposes of example that a high signal is enabling. When the channel enable signal is high, both CMOS buffer circuits are enabled. For a particular arm or channel to be selected, both the clock signal and the channel enable signal must be high for that particular memory module.

Although not required, each channel of the central switch circuit may include a pair of clocked registers 466. The clocked registers 466 may be absent in some implementations if a very low latency is required. The clocked register 466 is useful for buffering data when there is a difference in the data transfer rates of the data bus 427 and the memory module buses 460a, 460b, 460c, 460d. In addition, the central switch preferably includes a pair of termination resistors 463. Thus, the memory configuration can be described basically two point to point buses; one point to point bus from the termination resistor 463a to 463b, the other point to point bus from termination resistor 463c to 463d.

Figure 4D:
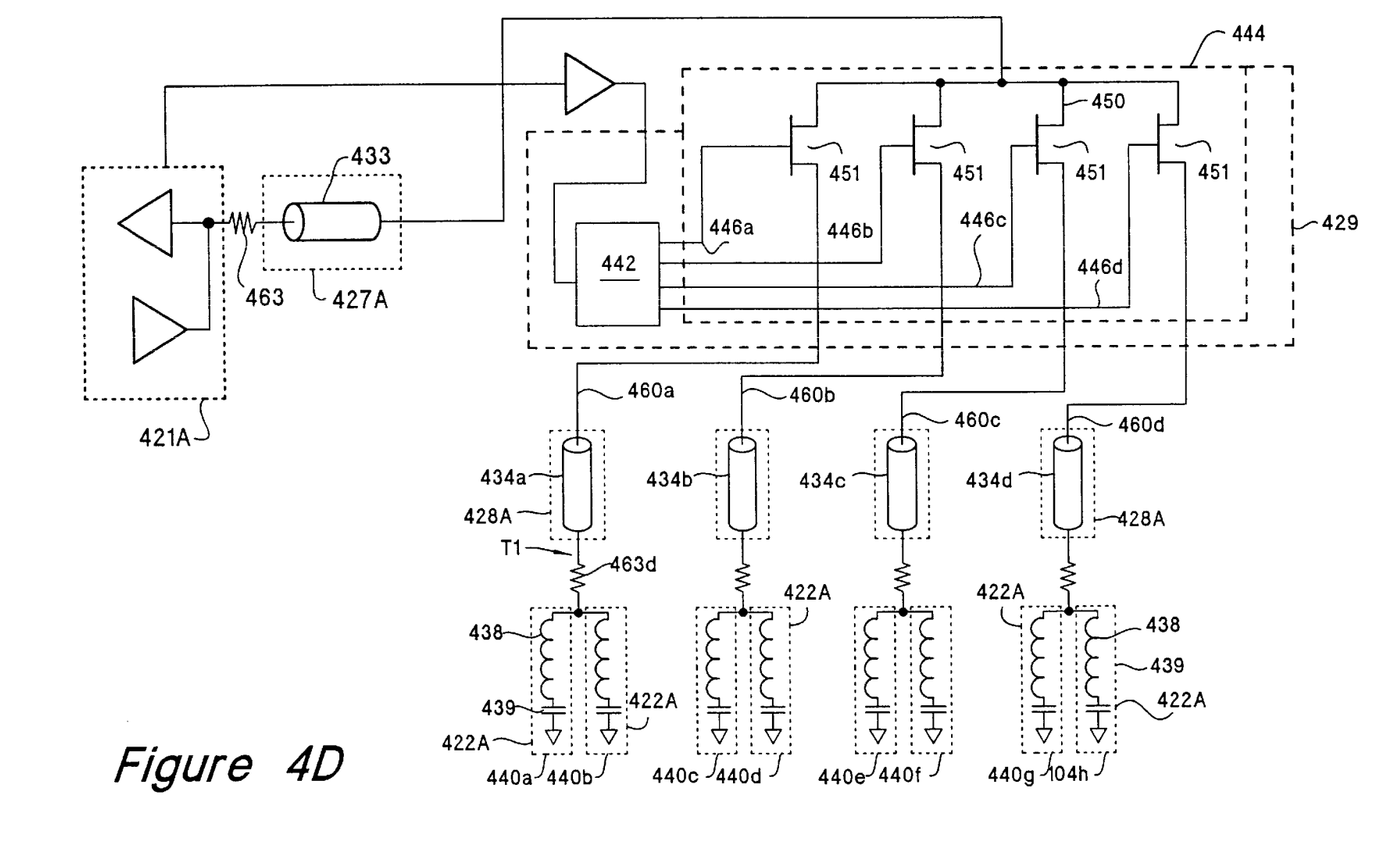
FIG. 4D is a schematic diagram of the radial arm memory bus configuration shown in FIG. 4B showing with more detail of an alternative implementation of the switching means.

Referring to FIG. 4D shows a schematic diagram of an alternative embodiment of the radial arm memory bus configuration shown in FIG. 4B. The embodiment shown in FIG. 4D uses a plurality of FET switches in the implementation of the central switch. For the four arm memory channel configuration shown, the decoding means 442 is preferably a 2:4 decoder. The input to the decoder 442 is a two bit address which indicates to the switch which one of the four FET switches 451a, 451b, 451c, or 451d is on. The control by the central switch of the present invention is preferred over the embodiment shown in FIGS. 3A–B, since the decoding is performed prior to the DIMM register on the DIMM module. This early decoding is critical since this decoding typically occurs in a timing critical path.

In the embodiment shown in FIG. 4D, the data selection circuit of the central switch includes a plurality (typically N) of FET switches 451a–d. Each FET switch 451a–d preferably includes three terminals: two terminals 450, 454 that can be switched between an electrically coupled state and an electrically decoupled state and a data selection terminal 452. The data selection terminal is electrically connected to the output of the decoder. In the preferred embodiment, only one decoder output is high, indicating which one of the four FET switches is closed (terminals 450 and 454 electrically coupled) during memory operations with the coupled memory device. For the FET switches that are open (the decoder output is low and terminals 450 and 454 electrically decoupled) the memory device 422A associated with the open switch is decoupled from the data bus as is the portion of the data bus between the central switch 429A and the memory device 422A. This means that no data can be sent or received by the memory device, or memory devices, that have been electrically decoupled from the data bus. Further, the capacitive load of the memory devices 422A which have been decoupled from the data bus as a result of the switch being open will no longer contribute to the overall capacitive load on the data bus (as seen by the memory controller and any coupled memory devices).

In the implementation of the switching means shown in FIG. 4D, the use of a plurality of FET switches is preferred. However, alternative implementations are possible. For example, in the preferred embodiment an SSTL-2 logic switch could be used provided the maximum through delay can be limited to less than 2.0 nsec. An SSTL-2 logic switch is typically preferred even though it would typically require an additional pin for the direction control, it supports additional high availability functions. In addition, the SSTL-2 logic implementation would typically segment the bus, and it would require the provision of built in VTT terminators. For the alternative implementation shown in FIG. 4D, one can only read from one memory module at a time because the memory module buses 460a, 460b, 460c, 460d are not isolated so that the memory channel buses limits the speed and thus, system performance. In addition, in the embodiment shown in FIG. 4D, one cannot do simultaneous read and writes.

In the preferred embodiment, each bit slice central switching device fits inside a rectangular 96 ball JEDEC LF BGA logic package. Each of the 96 ball JEDEC LFBGA packages includes 50 balls allocated for the 9×5 bit data ports, two balls allocated for the SSTL-2 clock and clock, ten balls allocated for the select control lines, and one ball allocated for the reset control line. The remaining balls in the package are for allocated for power and ground. Eighteen devices are sufficient to provide for a 72 bit wide bus including check bits, data, and strobes. Thirty-six devices would be needed for a 144 bit wide system with 18 DIMMs. In addition, each device should have an internal register on the SEL line driven by CLK and CLK_ input so that the external select logic can be resynchronized before driving the internal switch 444 controls.

The overall goal of this radial memory data bus structure is to support a large memory system (i.e. 64 GB) with the same latency and bandwidth as a small memory system so that the memory module at each arm is a field replaceable unit or FRU and independent from the other modules. A good goal is for the different memory channels or arms to run at 200 MHz in 21 (point to point) for a 144 wide bus. This gives a data rate of 7.2 GB/sec which a) reduces latency in the server and b) gives graphics subsystem performance. The configuration is based upon the concept that reducing the capacitive load of a memory data bus increases the overall speed at which data can propagate from the memory controller to memory devices, such as dynamic random access memory chips, and vice versa. In addition, lower capacitive loading of the data bus allows each of the data lines that make up the data bus to change states more quickly. By allowing data to be more quickly sent down a data bus, advances in CPU speed and memory chip speed can be taken advantage of more effectively.

In the preferred embodiment of the memory configuration, a termination circuit is connected to each DIMM module. The termination circuit's function is to impedance match the impedance on the data bus in order to minimize transmission line reflections. The termination circuit, typically a resistor, is preferably located at the end of the data bus.

Referring to FIG. 4C, in the preferred embodiment the termination circuit is a resistor connected in series with memory devices 422A. In an alternative embodiment, the termination circuit is connected in parallel with the memory device 422A at a point T1 located between at the end of each module portion 428A closest to the memory device 422A.

It is understood that the above description is intended to be illustrative and not restrictive. For example, the parallel memory devices be replaced with serial memory devices in a RAMBUS configuration. Further, the present invention may be used in combination with the configuration or processes disclosed in the related applications which are herein incorporated by reference. The scope of the invention should therefore not be determined with reference to the above description but instead should be determined with reference to the appended claims along with the full scope of equivalents to which such claims are entitled.

What is claimed is:

1. A memory configuration comprised of:
    a memory controller;
    a single central switch, the central switch electrically coupled to the memory controller by a data bus, wherein the single central switch and memory controller are affixed to a motherboard, wherein the single central switch includes a decoding means and a data selection means, wherein the single central switch includes a transceiver circuit which allows for bidirectional data flow; and
    a plurality of N memory modules, each memory module including at least one memory device, wherein each of the N memory modules is radially connected to a single central switch by its corresponding memory module bus.

2. The memory configuration recited in claim 1 wherein the transceiver circuit includes a pair of CMOS buffer circuits connected in parallel facing opposite directions, wherein inputs to the CMOS buffer circuit include a clock signal and a channel enable signal.

3. The memory configuration recited in claim 4 further including a clocked buffer register connected in series with the CMOS buffer circuit.

4. The memory configuration recited in claim 1 further including a first termination circuit connected in series between the memory controller and the central switch and for each memory module, a second termination circuit connected in series between the central switch and the memory devices on each memory module.

5. The memory configuration recited in claim 6 further including wherein the single central switch includes for each memory module a third and fourth termination circuit, wherein the third termination circuit is connected in series between the memory controller and the input of each of the channel selection circuits and the fourth termination circuit is connected in series between the output of each of the channel selection circuits and the memory devices on each memory module.

6. The memory configuration recited in claim 1 wherein the data selection means includes a plurality of FET switches connected in parallel, wherein the input to the FET switches is the output of the decoding means.

* * * * *